United States Patent [19]

Hamanaka et al.

[11] 4,368,495
[45] Jan. 11, 1983

[54] CARTRIDGE LOADING MECHANISM FOR MAGNETIC DISK DRIVE

[75] Inventors: Kunio Hamanaka, Hinode; Keigo Takahashi, Ome, both of Japan

[73] Assignee: Tokyo Shibaura Denki Kabushiki Kaisha, Japan

[21] Appl. No.: 158,325

[22] Filed: Jun. 10, 1980

[30] Foreign Application Priority Data

Jul. 13, 1979 [JP] Japan .................................. 54-88765

[51] Int. Cl.³ .............................................. G11B 17/04
[52] U.S. Cl. ..................................................... 360/97
[58] Field of Search .................................. 360/97–99

[56] References Cited

U.S. PATENT DOCUMENTS 3,891,796 6/1975 Takahara et al. ...................... 360/99
3,899,794 8/1975 Brown ................................... 360/97
4,272,794 6/1981 Skarky .................................. 360/97

Primary Examiner—Robert S. Tupper
Attorney, Agent, or Firm—Finnegan, Henderson, Farabow, Garrett & Dunner

[57] ABSTRACT

A cartridge loading mechanism for a magnetic disk drive apparatus of the present invention includes a cartridge receiver with a base plate which enables an operator to orient and locate a magnetic disk cartridge, which is inserted substantially in the horizontal direction through the front of the magnetic disk drive apparatus, so that the cartridge may be coupled with a driving mechanism and moved to a given operating position on the cartridge receiver while letting the apparatus sustain the weight of the cartridge.

7 Claims, 13 Drawing Figures

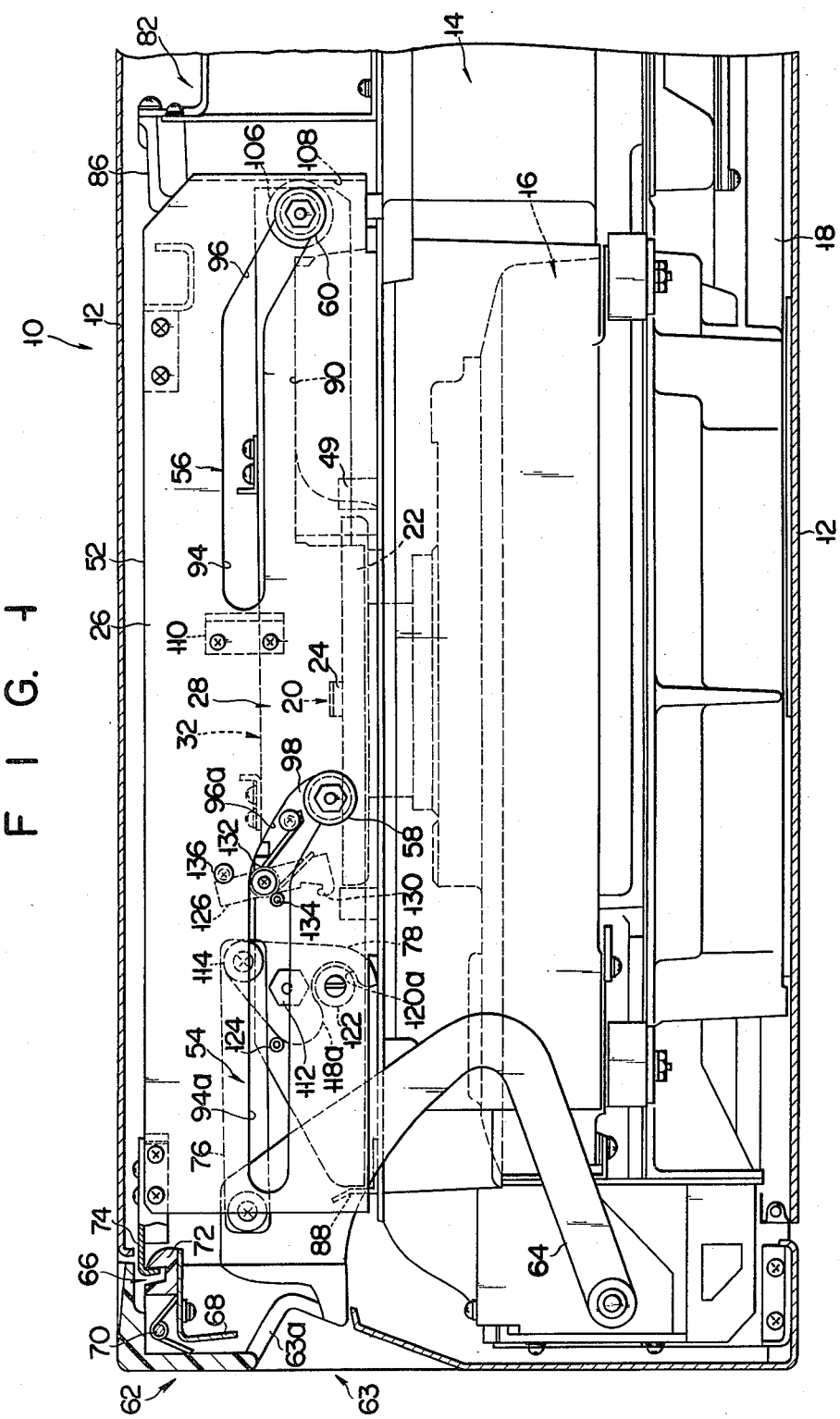

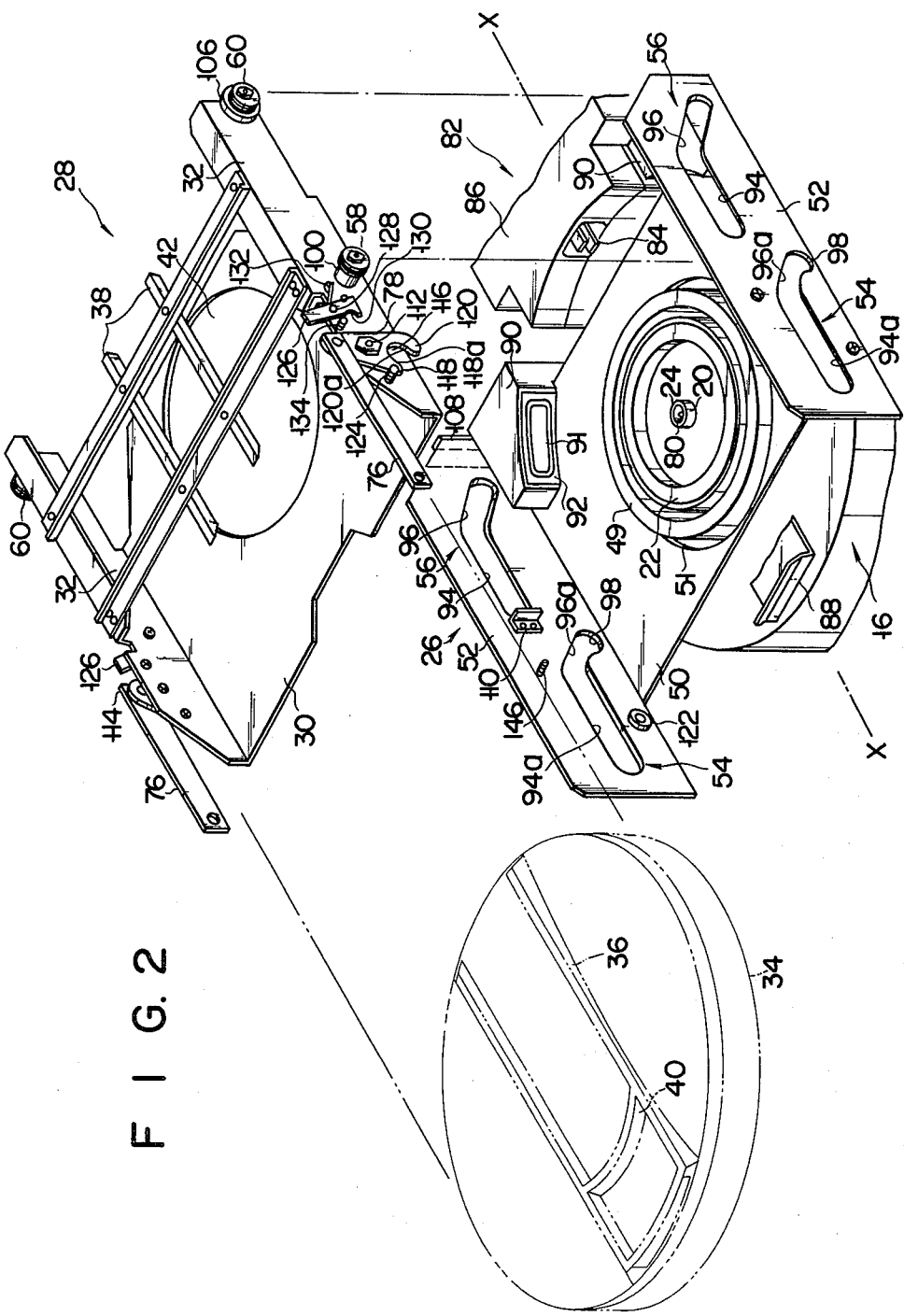

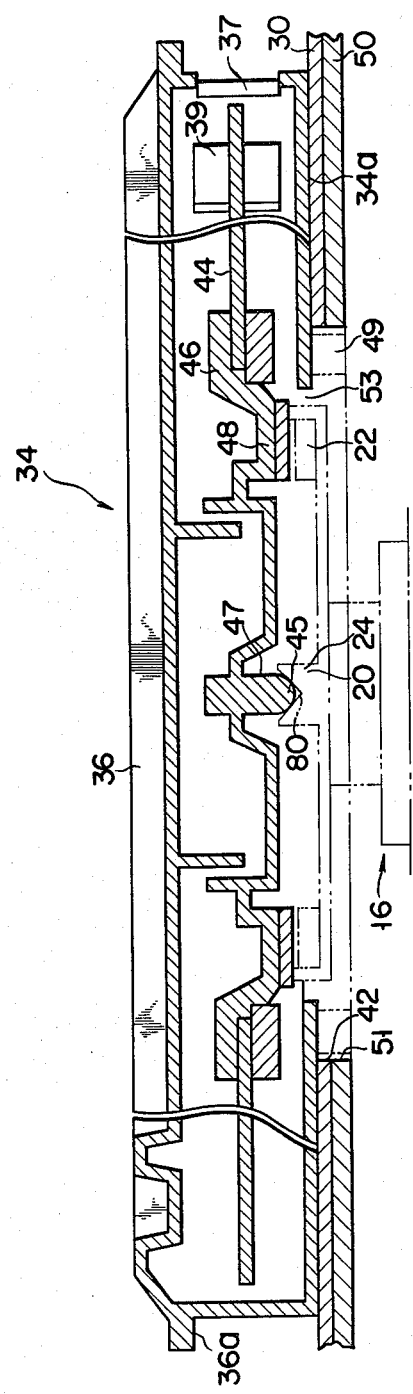

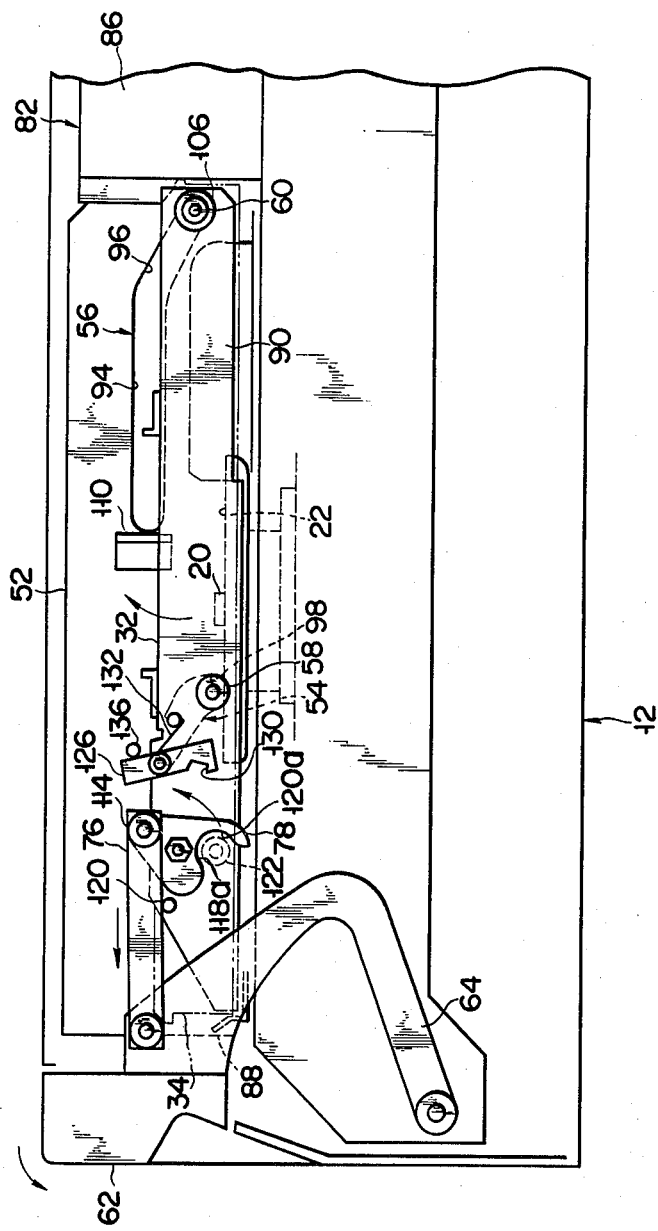

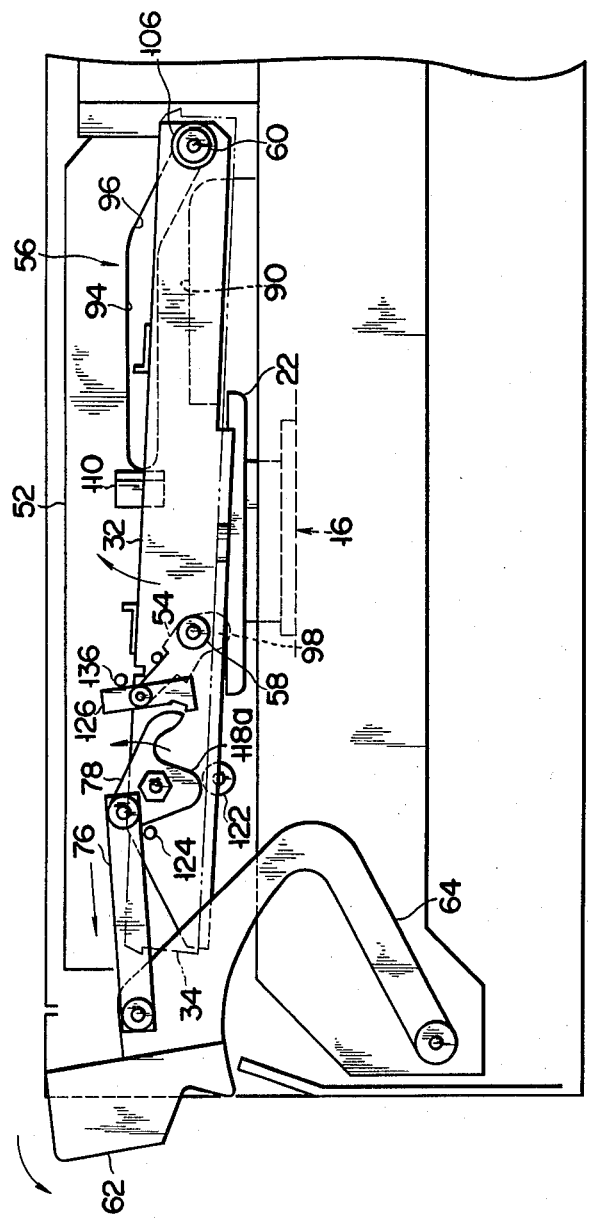

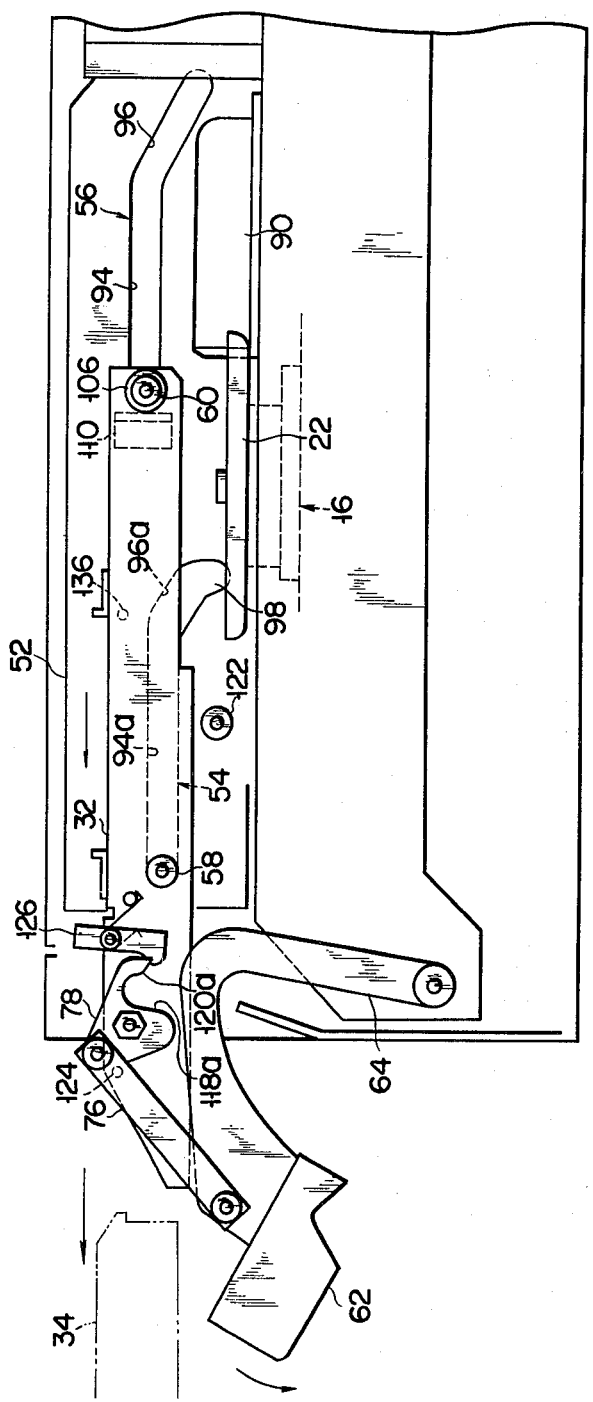

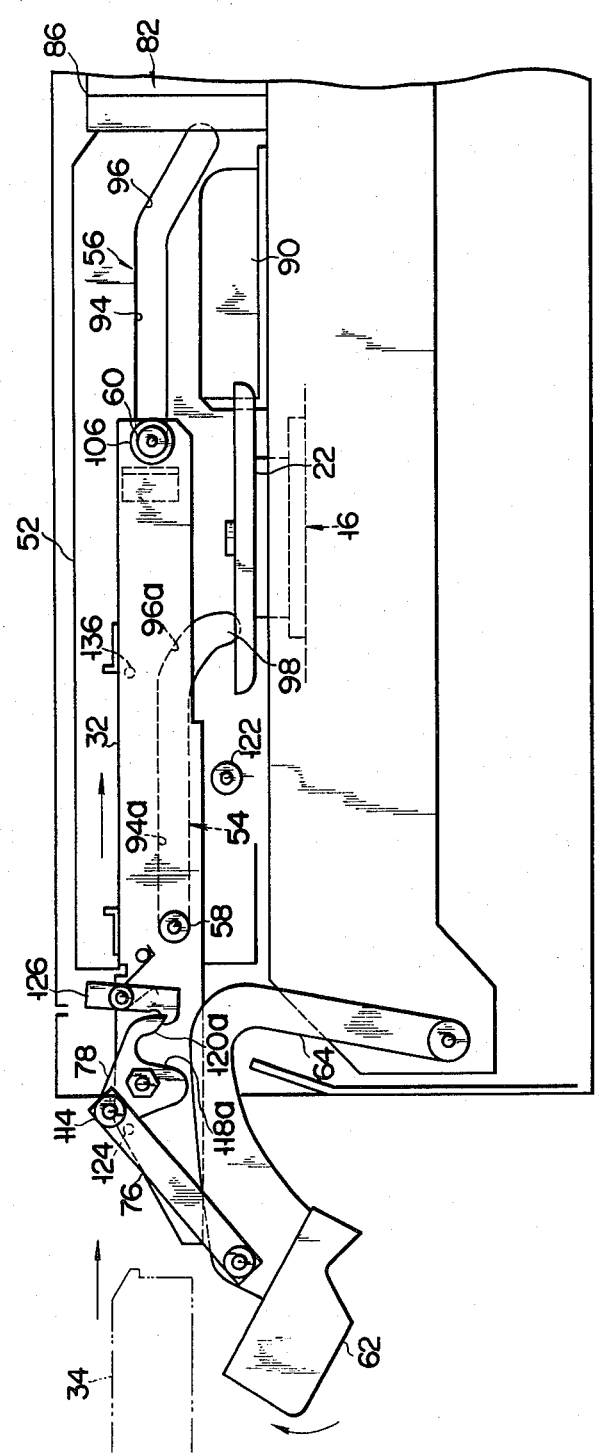

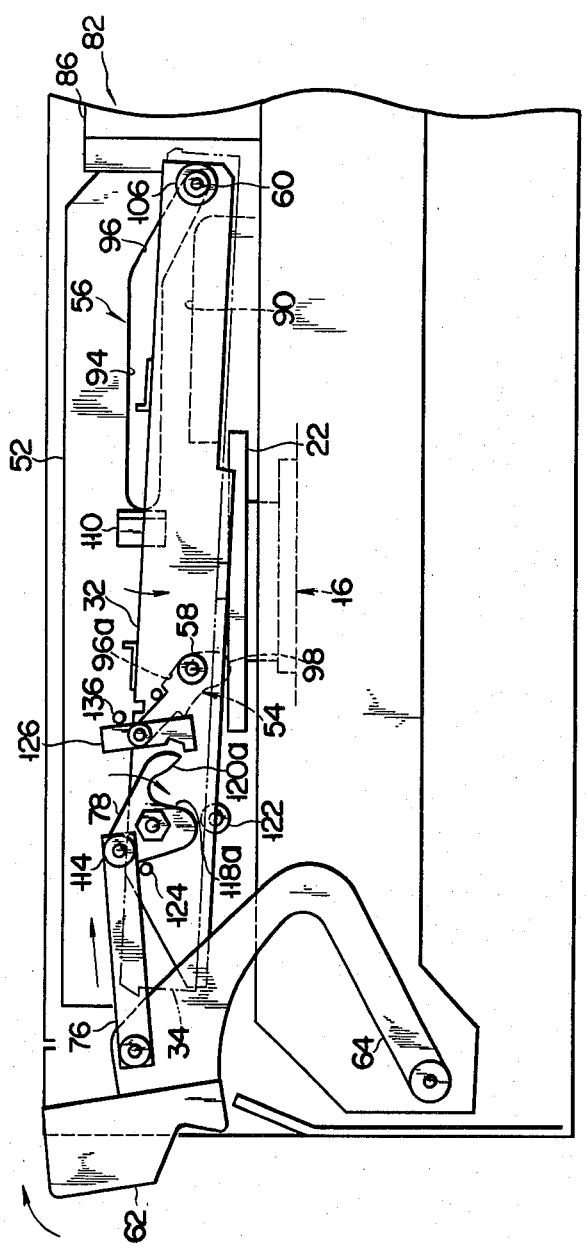

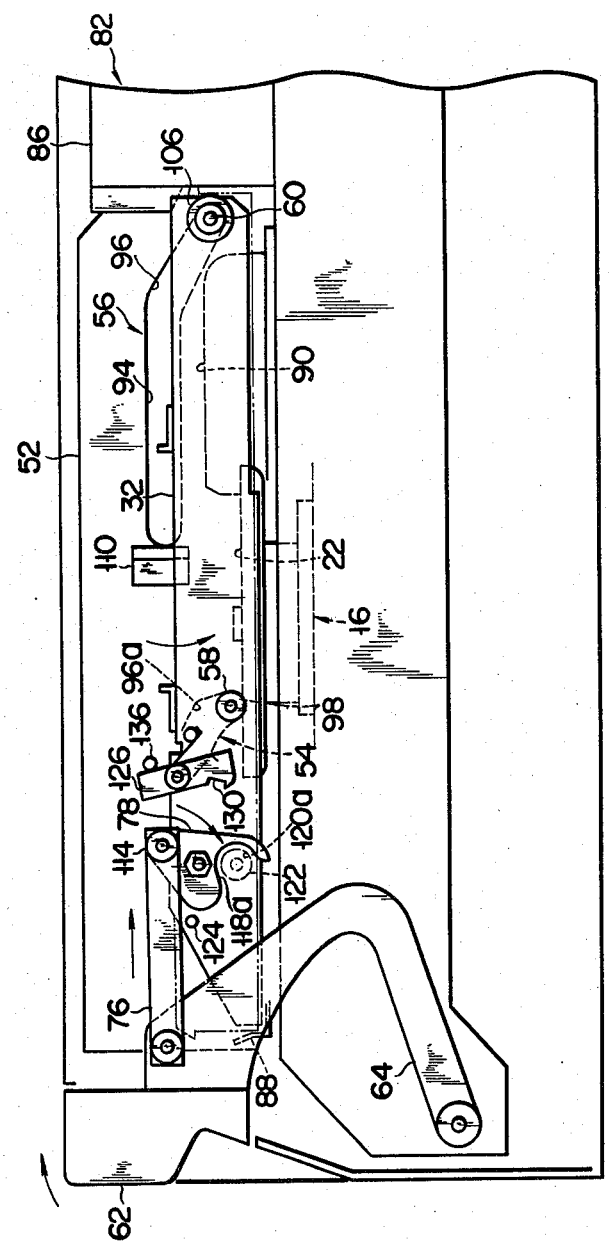

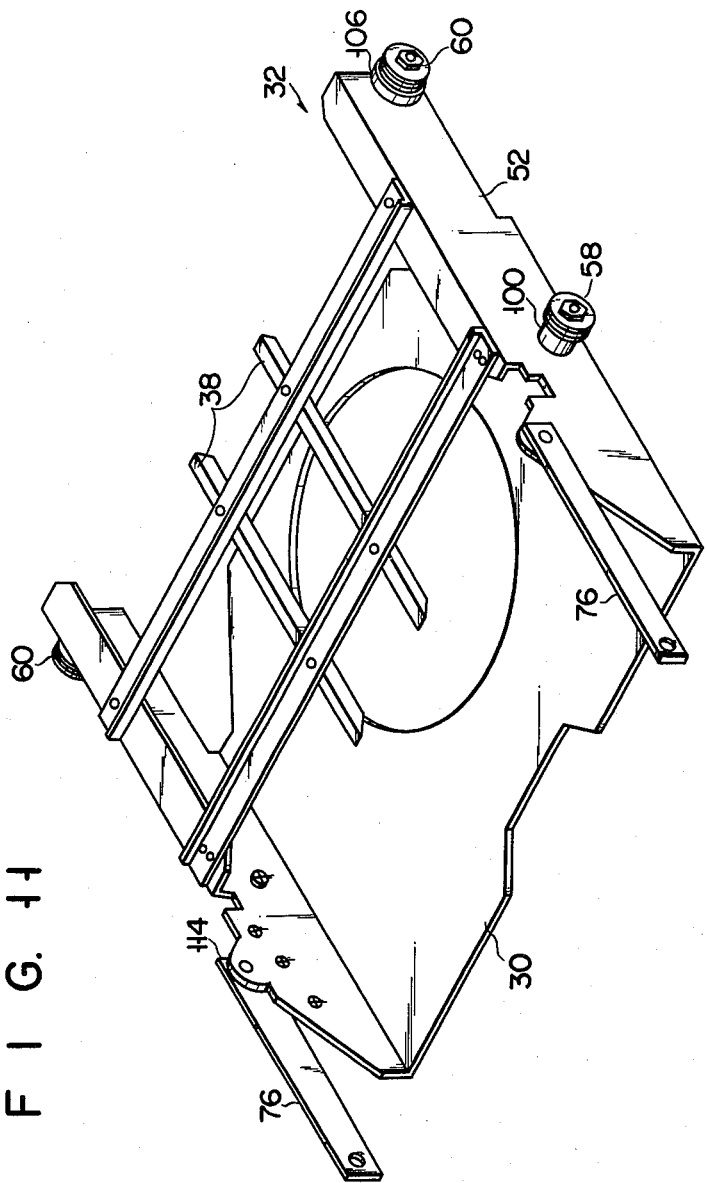

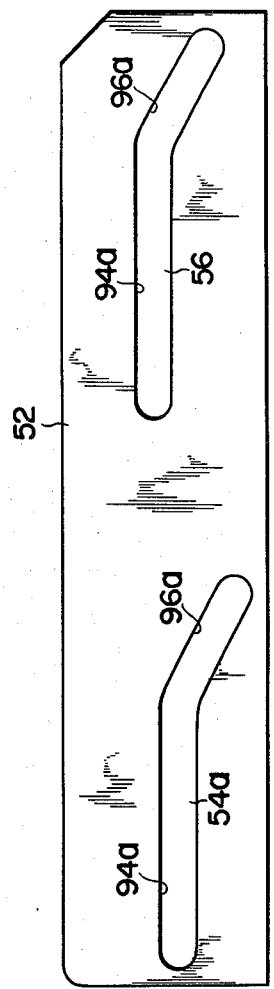

CARTRIDGE LOADING MECHANISM FOR MAGNETIC DISK DRIVE

This invention relates to a cartridge loading mechanism for magnetic disk drive apparatus which comprises a housing with an opening at the front end thereof, a driving means disposed in the housing, a cartridge receiver means supporting a magnetic disk cartridge inserted through the opening and containing at least a magnetic disk which is rotated by the driving means, first guide means for guiding the cartridge on the cartridge receiver means so that the cartridge may properly be oriented and located relative to the cartridge receiver means, a second guide means guiding the cartridge receiver means to an operating position where the magnetic disk in the cartridge is coupled with the driving means when the cartridge receiver means is pushed in backward, and guiding the cartridge receiver means to a non-operating position to allow takeout and setting of the cartridge when the cartridge receiver means is pulled forward, and a shift means for moving the cartridge receiver means in the longitudinal direction.

Up until now, the magnetic disk cartridge comprising a container and at least one magnetic disk rotatably included in the container has been widely used as replaceable recording media for data processing systems. The cartridge is loaded to a given position in the disk drive, where the disk is coupled to a driving mechanism to rotate the disk. Such cartridge loading or setting is conventionally made from above the disk drive. Accordingly, a space for the cartridge loading must be left above the disk drive. This makes it difficult to pile up a plurality of disk drives and mount them in a common rack. In order to avoid such drawback, the space for the cartridge replacement may be provided by designing the disk drive so that it can be drawn out sideways from the rack. With such method, however, it is necessary to draw out the heavy disk drive from the rack with every cartridge replacement. Thus, the operation cannot help being troublesome. Furthermore, the drawer mechanism and electric wiring would be complicated. Accordingly, there is further proposed a method to load the cartridge by fixing the disk drive in the rack and inserting the cartridge into the disk drive through the front end thereof without any substantial space above the disk drive. In spite of its positive advantages, this method still involves many difficult problems attributable to an inevitable fact that an opening defined in the front end of the disk drive and an internal space thereof for the setting and removal of the cartridge are narrow in the vertical direction. First, the operation to engage sideways the cartridge with a guide mechanism for guiding the cartridge to a given operating position while suspending the cartridge from above must be performed manually by an operator, requiring skill, as well as time and effort. Secondly, in drawing out the cartridge from its operating position, the cartridge must first be moved upward to release the disk from coupling with the driving mechanism. Especially in the case where the disk and the driving mechanism are coupled magnetically, it is hard to release such coupling by a light lateral operation. Thus, there has been a demand for the development of devices purged of these problems or drawbacks.

The object of this invention is to provide a cartridge loading mechanism effectuating the improvements that have been required by the prior art devices; capability of setting and removing a cartridge from the front end of the disk drive, improved operating efficiency, and relative compactness.

In order to attain the above object, the cartridge loading mechanism of the invention is provided with a cartridge receiver having a base plate capable of bearing a cartridge. The cartridge can be slid on the base plate into a given position thereon, guided by first guide means.

The use of the cartridge receiver with the base plate enables an operator to put the cartridge on the base plate and to engage the cartridge with the first guide means without sustaining the weight of the cartridge itself. Thus, the aforesaid coupling is greatly facilitated, and the operating efficiency of the cartridge loading mechanism of the invention is remarkably improved.

According to a preferred embodiment of this invention, the cartridge receiver has a pair of side walls, while the driving mechanism is fitted with a guide frame which has a pair of guiding side walls extending substantially in parallel with the side walls of the cartridge receiver. Front and rear guide rollers are erected on each of the paired side walls, while a front guide slot engaging the front guide roller and a rear guide slot engaging the rear guide roller are defined in each of the paired guiding side walls. The front guide slot is formed of a longitudinally extending horizontal portion, a slant portion sloping downward from the rear end of the horizontal portion, and a perpendicular portion descending perpendicularly from the rear end of the slant portion, while the rear guide slot is formed of a horizontal portion substantially as long as the horizontal portion of the front guide slot and a slant portion extending along a straight line connecting the rear end of the horizontal portion of the rear guide slot with a position corresponding to the bottom end of the perpendicular portion of the front guide slot. The disk drive is provided at its front portion with a shift means for moving or shifting the cartridge receiver, which shift means is coupled to the cartridge receiver by means of a link mechanism. The link mechanism is equipped with a raising mechanism which is driven by a forward movement of the shift means when the cartridge is pulled forward from its operating position, thereby forcing up the front guide roller to the upper end of the perpendicular portion.

By the action of the raising mechanism, the front guide roller of the cartridge receiver in the operating position may be forced up to the upper end of the perpendicular portion. Thus, the disk in the cartridge is released from the coupling with the driving mechanism in the first place, so that the subsequent forward movement of the cartridge along the slant and horizontal guide slot portions will be facilitated.

This invention can be more fully understood from the following detailed description when taken in conjunction with the accompanying drawings, in which:

FIG. 1 shows a partial sectional side view of an embodiment of the mechanism of this invention;

FIG. 2 shows a perspective view of the principal part of the mechanism of FIG. 1;

FIG. 4 is a sectional view showing a magnetic disk cartridge set on an operating position;

FIGS. 5 to 10 are side views of various operating steps of the mechanism of FIG. 1;

FIG. 11 is a perspective view of a cartridge receiver used for another embodiment of the invention; and FIG. 12 shows the shapes of front and rear guide slots cooperating with the cartridge receiver of FIG. 11.

Figure 3A:
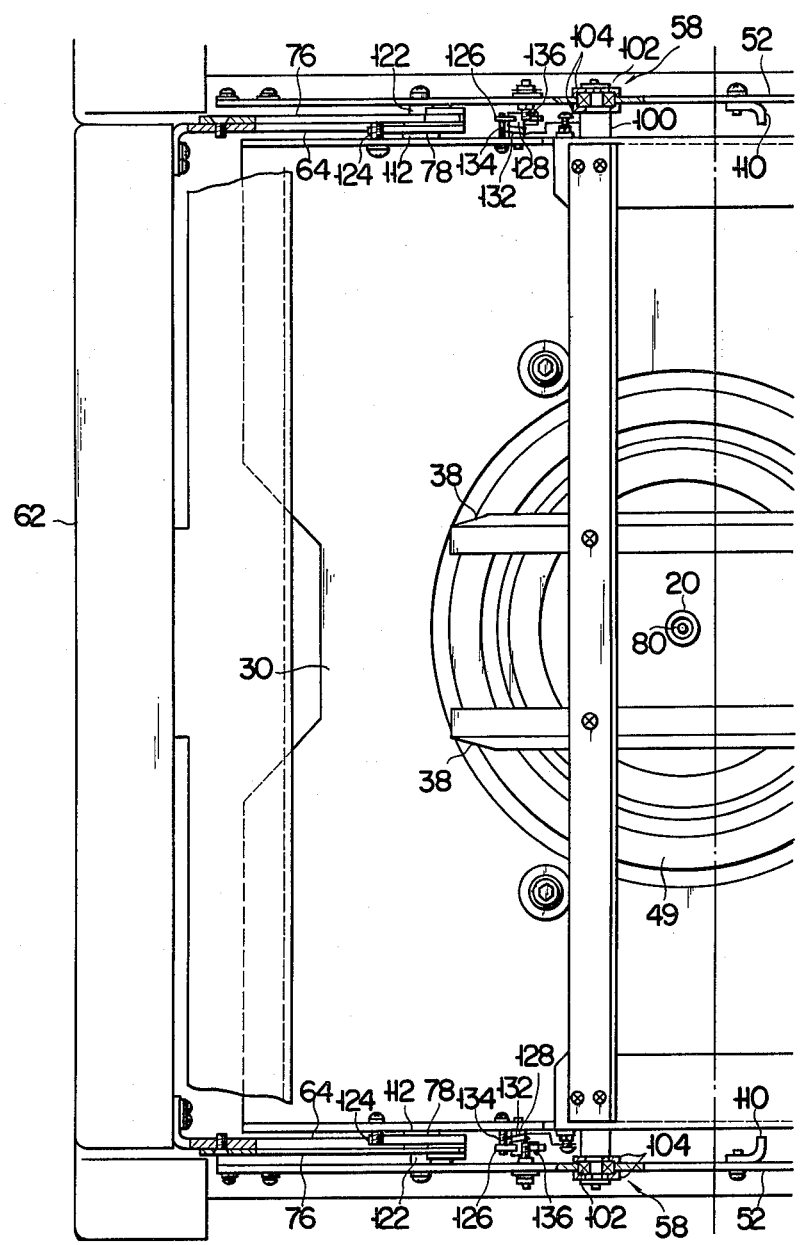
FIGS. 3A and 3B show a plan of the principal part of the mechanism of FIG. 1.

Referring first to the drawings of FIGS. 1, 2, 3A, 3B and 4, there will be described the construction of an embodiment of the mechanism of this invention. As shown in FIG. 1, a disk drive 10 includes a housing 12 and an internal structure 14. A driving mechanism 16, included in the internal structure 14 and forming a means for driving a magnetic disk, is driven by a motor (not shown) by means of a driving belt 18, and, as shown in FIG. 1, a drive spindle 20 protrudes substantially in the perpendicular direction from the driving mechanism 16. Fitted on the tip end portion of the drive spindle 20 is a driving-side magnetic coupling member 22 for coupling the magnetic disk to the driving mechanism 16. At the projecting end portion of the drive spindle 20, there is formed a driving-side shaft fitting portion 24 with a conical centering hole 80.

As shown in FIG. 2, a guide frame 26 is attached to the upper portion of the driving mechanism 16, and a cartridge receiver 28 is guided by the guide frame 26 to move in the longitudinal direction, i.e. direction X—X of FIG. 2. The cartridge receiver 28 has a substantially square base plate 30 disposed substantially horizontally and side walls 32 rising substantially perpendicularly from the side edges of the base plate 30 which extend along the direction X—X. Numeral 34 designates a cartridge which, in this case, is of a type containing a single magnetic disk. The cartridge 34 has two guide ridges 36 formed on the top thereof. Numeral 38 designates two guide bars attached to the cartridge receiver 28. The outside interval between the two guide bars 38 is a little narrower than the inside interval between the two guide ridges 36 so that the guide bars 38 may smoothly be received and slidden between the guide ridges 36. Therefore, if the cartridge 34 is put on the base plate 30 and slid backward, i.e. toward the right of FIGS. 1, 2, 3A and 3B, with the guide ridges 36 oriented substantially along the direction X—X, then it will be inserted into the cartridge receiver 28 with the guide ridges 36 oriented as they are. Thus, the guide ridges 36 and guide bars 38 constitute a first guide means. In this case, the coupling between the members 36 and 38 may be facilitated by forming a slant portion (not shown) at the meeting end of each guide ridge 36 or guide bar 38. When the guide bars 38 engage deeply with the guide ridges 36 to cause the forward ends of the guide bars 38 to run against a stopper wall 40 of the cartridge 34 formed at right angles to the guide ridges 36, the cartridge 34 is deemed to have reached its proper or given position. At this time, the center of the cartridge 34 is substantially in vertical alignment with the center of a circular opening 42 defined in the base plate 30.

The guide frame 26 is mounted horizontally on the driving mechanism 16, and has a substantially square fixed plate 50 and guiding side walls 52 rising from both side edges of the fixed plate 50 which extend along the direction X—X. Front and rear guide slots 54 and 56 are bored through each of the guiding side walls 52, while front and rear guide rollers 58 and 60 to engage respectively the front and rear guide slots 54 and 56 on their corresponding side are mounted on each of the side walls 32 of the cartridge receiver 28. Since the front and rear guide rollers 58 and 60 are so constructed as to be able to move along the front and rear guide slots 54 and 56, respectively, the cartridge receiver 28, when pushed in the longitudinal direction, may move along a path which is defined by the guide slots 54 and 56. Thus, the guide slots 54 and 56 and the guide rollers 58 and 60 constitute a second guide means to restrict the movement of the cartridge receiver 28. The shapes of the guide slots 54 and 56 and the motion of the cartridge receiver 28 depending on such shapes will be described later in detail.

As shown in FIG. 1, a cover 62 is attached to the front portion of the housing 12. The cover 62 is fixed on the tip end of V-shaped arms 64 which are pivotally mounted on the housing 12. When the cover 62 is swung forward, the front end of the housing 12 is opened. The cover 62 and the arms 64 constitute a door means for opening and closing an opening 63 at the front end of the casing 12. When put on, the cover 62 is held between the guiding side walls 52 by means of a lock mechanism 66 at the upper portion of the cover 62. The lock mechanism 66 may be released to undo the cover 62 by rocking a lever 68 clockwise around a pivot 70 with the operators fingers inserted through a window 63a defined in the cover 62, then removing a first engaging member 72 from a second engaging member 74 attached to the guiding side wall 52, and finally pulling out the cover 62 toward the operator. Each arm 64 on the cover 62 is coupled to the side wall 32 by means of a coupling link 76 and a cam member 78 to serve as a means for moving the cartridge receiver 28. The cartridge receiver 28 is pulled forward until its forward end projects from the opening 63 of the housing 12 (see FIG. 7) by undoing the cover 62, while it is pushed backward by putting on the cover 62. When the cartridge receiver 28 is in this position, the cartridge 34 mounted thereon is located over the driving mechanism 16, and, as shown in FIG. 4, a driven-side magnetic coupling member 48, which is mounted on a fitting member 46 fitted with a magnetic disk 44 inside the cartridge 34, is attracted to the driving-side magnetic coupling member 22 of the driving mechanism 16, thereby coupling the magnetic disk 44 to the driving mechanism 16. In coupling the two members 22 and 48, the drive spindle 20 of the driving mechanism 26 must be in accurate alignment with a shaft 47 of the magnetic disk 44. In order to effectuate such precise alignment, the tip end of the output spindle 20 is provided with the conical centering hole 80 to serve as the driving-side fitting portion, as already mentioned, and a hemispherical portion 45 formed at the bottom of the shaft 47 which is located in the center of the fitting member 46 holding the magnetic disk 44 is fitted in the centering hole 80. Thus, the coupling between the driving mechanism 16 and the magnetic disk 44 can be achieved by a coupling means which comprises a magnetic coupling system including the members 22 and 48 and a mechanical coupling system consisting of the conical centering hole 80 and hemispherical portion 45.

In FIGS. 1, 2, 3A, 3B and 4, numeral 49 designates a ring-shaped sealing projection rising from the top end of the driving mechanism 16. As is most clearly shown in FIG. 4, the sealing projection 49 extends upwardly through an opening 51 in the fixed plate 50 and the opening 42 in the base plate 40 to abut against a bottom 34a of the cartridge 34 disposed in place on the cartridge receiver 28, surrounding an opening 53 in the bottom 34a, thereby isolating the interior of the cartridge 34 from the outside to prevent foul outside air from entering the cartridge 34. In the prior art devices, a projection corresponding to the sealing projection 49 is held against a shoulder portion 36a (FIG. 4) of the cartridge. The device of the invention cannot, however, be provided with a sealing projection of such type because the cartridge receiver 28 has the base plate 30. Thus, there is provided the sealing projection 49 which protrudes through the opening 42 of the base plate 30 and is pressed against the bottom 34a of the cartridge 34.

As may be seen from FIGS. 2, 3A, 3, and 4, a magnetic head mechanism 82 is disposed in the housing 12, and a magnetic head 84 included in the magnetic head mechanism 82 is inserted into the cartridge 34 through a magnetic head inlet 37 bored through the rear lateral side of the cartridge 34 which is set in place. The magnetic head 84 is moved along the magnetic disk 44 by the operation of a linear motor (not shown) included in the magnetic head mechanism 82. The rear end of the cartridge 34 held in place is in contact with a casing 86 of the magnetic head mechanism 82, while the forward end is restricted in its forward movement by a stopper 88. In FIGS. 2, 3A and 3B, numeral 90 designates two blast nozzles attached to the fixed plate 50 of the guide frame 26. The nozzles 90 introduce clean air into the cartridge 34 through openings 39 which are defined in the rear lateral side of the cartridge 34 so as to face the nozzles 90, thereby keeping the interior of the cartridge 34 clean. Around an opening 91 of each blast nozzle 50, there is attached a seal member 92 formed of elastic material, which maintains the isolation of the openings 39 in the rear lateral side of the cartridge 34 from the open air. See FIG. 2.

Now there will be described how the cartridge receiver 28 is pushed and pulled in the longitudinal direction by operating the cover 62, as well as a mechanism to decide such motion of the cartridge receiver 28. The front and rear guide slots 54 and 56 in the guiding side walls 52 of the guide frame 26 have different shapes. That is, as shown in FIG. 1, the rear guide slot 56 is formed of a horizontal portion 94 and a slant portion 96 declining backward from the rear end of the horizontal portion 94, while the front guide slot 54 is formed of a horizontal portion 94a as long as the horizontal portion 94, a slant portion 96a declining backward from the rear end of the horizontal portion 94a with a smaller gradient than that of the slant portion 96, and a perpendicular portion 98 extending downward from the rear end of the slant portion 96a substantially in the perpendicular direction. The overall horizontal lengths of the guide slots 54 and 56 are substantially equal. The vertical length of the perpendicular portion 98 of the guide slot 54, as described later in detail, is so selected that if the forward end portion of the cartridge receiver 28 is forced up when the front and rear guide rollers 58 and 60 are located at the lower end portions of the perpendicular portion 98 and the slant portion 96, respectively, to keep the cartridge receiver 28 horizontal, then the front guide roller 58 may rise along the perpendicular portion 98, and that the cartridge receiver 28 may rock around the rear guide roller 60 to slant at a given angle.

In the aforesaid state, the cartridge receiver 28 is located substantially horizontally in a position vertically corresponding to the driving mechanism 16, and the cartridge 34 held by the cartridge receiver 28 is interposed between the housing 86 of the magnetic head means 82 and the locating stopper 88 attached to the driving mechanism 16. Further, the driven-side magnetic coupling member 48 for the magnetic disk 44 in the cartridge 34 is coupled with the driving-side magnetic coupling member 22 of the driving mechanism 16 which corresponds to the member 48, and the conical centering hole 80 in the tip end of the drive spindle 20 of the driving mechanism 16 is coupled with the hemispherical portion 45 at the tip end of the shaft 47 extending downward from the magnetic disk fitting member 46. Thus, the magnetic disk 44 and the driving mechanism 16 are properly coupled on the same axis.

Figure 3B:
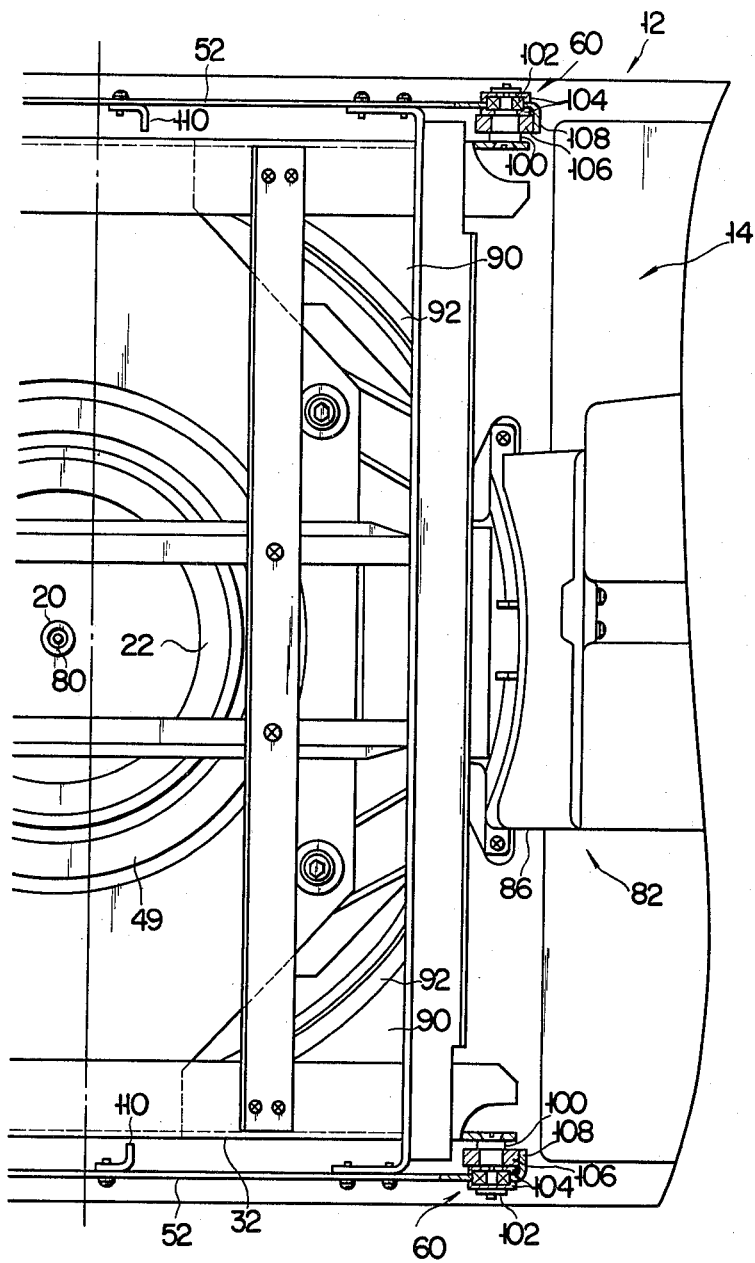

As is clearly shown in FIGS. 3A and 3B, the front and rear guide rollers 58 and 60 each include a shaft 100 mounted on the side wall 32 of the cartridge receiver 28, a bearing 102 fitted on the shaft 100, and collar members 104 fitted on both sides of the bearing 104, and roll along their corresponding front and rear guide slots 54 and 56 with the bearing 102 fitted in each of these slots. The collar members 104 hold the guiding side wall 52 from both sides of the bearing 102, preventing the bearing 102 from slipping off its corresponding guide slot 54 or 56. A cushion roller 106 formed of elastic material is fitted on the shaft 100 of the rear guide roller 60 on the side wall 32 side of the cartridge receiver 28. The cushion roller 106 is restricted in its longitudinal motion by a stopper portion 108 formed by bending the rear edge portion of the guiding side wall 52 and a stopper member 110 attached to the guiding side wall 52. The positions of the stopper portion 108 and the stopper member 110 practically correspond to the positions of the cushion roller 106 that are obtained when the bearing 102 of the rear guide roller 60 is located at the rear and forward ends of the rear guide slot 56, respectively.

As is clearly shown in FIGS. 1, 2, 3A and 3B, the cam member 78 is rockably mounted on a pivot 112 extending from the forward portion of the cartridge receiver 28 toward its corresponding guiding side wall 52 of the guide frame 26. The rear end of the coupling link 76 is pivotally mounted on the top end portion of the cam member 78, i.e. an operating end 114. At the bottom end portion of the cam member 78, on the other hand, there are upper and lower jaw portions 118 and 120 and a notch 116 defined by these jaw portions and opening forward. An engaging roller 122 is rotatably attached to the forward portion of a path along which the notch 116 moves when the cartridge receiver 28 is moved along the guide frame 26.

Edges 118a and 120a of the upper and lower jaw portions 118 and 120 defining the notch 116 are called cartridge raising and lowering faces, respectively. They are so named because if the coupling link 76 and hence the operating end 114 are pulled forward with the engaging roller 122 fitted in the notch 116, the engaging roller 122 will be depressed by the cartridge raising face 118a of the upper jaw portion 118 to force up the front portion of the cartridge receiver 28 as a reaction, and because if the coupling link 76 and hence the operating end 114 are pushed backward in the same situation, the engaging roller 122 will be forced up by the cartridge lowering face 120a of the lower jaw portion 120 to force down the front portion of the cartridge receiver 28 also as a reaction. Thus, the cam member 78 and the engaging roller 122 constitute a raising mechanism to act on the front end of the cartridge receiver 28. Moreover, a stopper pin 124 is erected on the forward portion of the side wall 32 of the cartridge receiver 28. This stopper pin 124 abuts against the top edge of the upper jaw portion 118 of the cam member 78 to stop the cam member 78 from rocking when the cam member 78 is driven to rock counterclockwise by the coupling link 76.

As shown in FIGS. 1, 2, 3A and 3B, a pin 128 rockably fitted with a locking lever 126 is erected behind the cam member 78 on the side wall 32 of the cartridge receiver 28. The locking lever 126 is pivotally mounted on the pin 128 at its central portion and extends vertically. The upper end of the locking lever 126 protrudes beyond the side wall 32, while the lower end has a forwardly projecting hook portion 130 formed thereon. A coil spring 132, as is most clearly shown in FIG. 1, urges the locking lever 128 in the clockwise direction of FIG. 1, and functions so that the hook portion 130 may engage the tip end of the lower jaw portion 120 of the cam member 78 to lock the cam member 78 in place when the cam member 78 is driven to rock counterclockwise by the coupling link 76. A stopper pin 134 on the side wall 32 prevents the locking lever 126 from excessive counterclockwise rotation. On the guiding side wall 52 of the guide frame 26, as is clearly shown in FIGS. 1, 3A and 3B, there is erected a release pin 136 for releasing the tip end of the lower jaw portion 120 from the engagement with the hook portion 130. When the cartridge receiver 28 is moved backward, the upper end portion of the locking lever 126 abuts against the release pin 136 to be pushed forward, and thence the lower end portion of the locking lever 126 is moved backward. Thus, the cam member 78 is released from the engagement with the hook portion 130 at the lower end portion of the locking lever 126.

Referring mainly to the drawings of FIGS. 5 to 10, there will now be described the operation of the above-mentioned embodiment.

FIG. 5 shows a situation where the cartridge 34 is perfectly set in the disk drive 10. In this state, the cartridge receiver 28 is inserted in its backmost position, that is, fully housed in the housing 12, and the rear guide roller 60 on the cartridge receiver 28 is located substantially at the rear end of the slant portion 96 of the rear guide slot 56 defined in the guiding side wall 52, causing the cushion roller 106 to abut against the stopper portion 108 of the guiding side wall 52. Further, the front guide roller 58 is located at the bottom end of the perpendicular portion 98 of the front guide slot 54, and the cartridge receiver 28 is located substantially horizontally in the given position over and near the driving mechanism 16. Moreover, as may be seen from FIG. 5, the cover 62 is locked for closure, the operating end 114 of the cam member 78 is pushed by the coupling link 76 to be located in its back position, and the engaging roller 122 is sandwiched between the cartridge raising and lowering faces 118a and 120a of the cam member 78. At this time, the cartridge receiver 28 cannot move longitudinally since the front guide roller 58 is located in the perpendicular portion 98 of the front guide slot 54, and also is prevented from vertical movement because the engaging roller 122 on the guiding side wall 52 is held between the upper and lower jaw portions 118 and 120 of the cam member 78. In this situation, the magnetic disk 44 in the cartridge 34 is magnetically coupled with the driving mechanism 16 as it is in alignment with the drive spindle 20 of the driving mechanism 16, the opening side of the blast nozzle 90 is brought in airtight contact with the rear lateral side of the cartridge 34 by means of the seal member 92, and the bottom 34a of the cartridge 34 is in airtight touch with the sealing projection 49 extending from the driving mechanism 16.

In taking out the cartridge 34 in the position of FIG. 5, the lock mechanism 66 is first released by pressing the lever 68 on the cover 62, and cover 62 is pulled forward (FIG. 1). As a result, the operating end 114 of the cam member 78 is pulled forward, as shown in FIG. 5. Hereupon, the cartridge receiver 28 is prohibited from longitudinal movement, as mentioned before, so that the cam member 78 rocks counterclockwise, and the forward end portion of the cartridge receiver 28 rocks clockwise around the rear guide roller 60 as a reaction to the depression of the engaging roller 122 by the cartridge raising face 118a, as shown in FIG. 6. By such rocking of the cartridge receiver 28, the magnetic disk in the cartridge 34 is forced to be released from the magnetic coupling with the driving mechanism 16. The release of the magnetic coupling may be achieved by a relatively small force since the cam member 78 serves as a lever. In consequence, the front guide roller 58 reaches the upper end of the perpendicular portion 98 or the rear end of the slant portion 96a, and thus the lower edge of the cartridge 34 at the front end thereof is located above the upper end of the stopper 22. Thus, the cartridge receiver 28 is ready to be forwardly drawn out.

Subsequently, when the cover 62 is pulled forward, the cam member 78 abuts against the stopper pin 124 to be prohibited from rocking, so that the cartridge receiver 28 is forwardly drawn out along with the cover 62 (FIGS. 6 and 7). When the cartridge receiver 28 is pulled forward, the front and rear guide rollers 58 and 60 roll along the slant portions 96a and 96 of the front and rear guide slots 54 and 56, respectively, and the cartridge receiver 28 moves upward as a whole. When the front and rear guide rollers 58 and 60 are located at the horizontal portions 94a and 94, respectively, the cartridge receiver 28 takes a substantially horizontal position. Further, when the rear guide roller 60 reaches the forward end of the rear guide slot 56, as shown in FIG. 7, the cushion roller 106 abuts against the stopper member 110 to arrest the advance of the cartridge receiver 28, and the forward end portion of the cartridge receiver 28 juts out from the front of the housing 12. In this situation, the cover 62 is fully rocked in the forward direction, and is urged further to rock forward by its own weight. Therefore, the cartridge receiver 28 is pulled forward, and will remain forwardly projecting if an operator release his hold of the cover 62. When the cartridge receiver 28 is guided by the front and rear guide slots 54 and 56 to move forward in the course of its movement in the aforesaid manner, the upper end portion of the locking lever 126 is disengaged from the release pin 136, so that the lower end portion of the locking lever 126 is moved forward by the action of the coil spring 132 to cause the hook portion 130 to engage the bottom end of the lower jaw portion 120, locking the cam member 78 to a position where its operating end 114 is shifted forward. In this state, since the forward end of the cartridge receiver 28 is projected in front of the housing 12, as aforesaid, the operator may take out the cartridge 34 with ease.

In setting the cartridge 34 in the disk drive 10, the cartridge 34 is inserted from the front of the cartridge receiver 28, as shown in FIG. 8. Such insertion of the cartridge 34 is accomplished by firstly putting the cartridge 34 on the base plate 30 of the cartridge receiver 28, moving it backward, then manually orienting the cartridge 34 so that the parallel guide ridges (FIG. 2) thereon may be guided by the guide bars 38 of the cartridge receiver 28, and finally sliding it until the guide bars 28 abut against the stopper wall 40. At this time, the position of the cartridge 34 is a proper position to be taken relatively to the cartridge receiver 28, that is, a position where the center of the magnetic disk 44 in the cartridge 34 is substantially in vertical alignment with the center of the opening 42 of the cartridge receiver 28.

Then the cover 62 is rocked clockwise with the arm 64, as shown in FIGS. 8 and 9. By such rocking, the operating end 114 of the cam member 78 is moved backward by means of the coupling link 76. Since the cam member 78, locked by the locking lever 126, cannot be rocked, however, the cartridge receiver 28 moves backward with the cartridge 34 thereon. When the front and rear guide rollers 58 and 60 reach the respective slant portions 96a and 96 of their corresponding guide slots 54 and 56, the cartridge receiver 28 moves declivously, inclining so that its forward end is located above its rear end. Subsequently, when the cartridge receiver 28 is moved further backward to allow the rear guide roller 60 to reach the rear end of the slant portion 96, as shown in FIG. 9, the cushion roller 106 abuts against the stopper portion 108 of the guiding side wall 52, and thus the cartridge receiver 28 is prohibited from further backward movement. At this time, the front guide roller 58 is located at the rear end of the slant portion 96a or the upper end of the perpendicular portion 98, and the front portion of the cartridge receiver 28, although intending to move downward by its own weight, maintains the aforesaid inclined position with the cartridge raising face 118a of the cam member 78 abutting against the top of the engaging roller 122. At the same time, the rear lateral side of the cartridge 34 is in contact with the housing 86 of the magnetic head means 82, as well as with the seal members 92 on the blast nozzles 90. Moreover, in this state, the release pin 136 abuts against the upper end portion of the locking lever 126 to push it forward, so the hook portion 43 at the bottom end of the locking lever 126 moves backward, thereby releasing the cam member 78 from the engagement with the locking lever 126 to allow the cam member 78 to rock freely.

Thereafter, when the cover 62 is moved further backward, the cam member 78 rocks clockwise, and the front portion of the cartridge receiver 28 is lowered it is sustained by the cartridge raising face 118a of the cam member 78. When the cam member 78 rocks in this manner to cause the engaging roller 122 to start touching the cartridge lowering face 120a, the engaging roller 122 is forced up by the lowering face 120a. As a reaction, the front portion of the cartridge receiver 28 is forced down, and the front guide roller 58 moves to the bottom end of the perpendicular portion 98 of the front guide slot 54 to locate the cartridge receiver 28 in the substantially horizontal position. Thus, the setting of the cartridge 34 is completed.

According to the above-mentioned embodiment of the mechanism of the invention, the cartridge may be set in the disk drive by putting the cartridge 34 on the base plate 30 of the cartridge receiver 28, sliding it on the base plate 30, and engaging the guide ridges 36 of the cartridge 34 with the guide bars 38 of the cartridge receiver 28. Thus, the cartridge setting may be achieved much more easily than the setting in a device without a base plate. Moreover, according to the mechanism of such embodiment, the cartridge 34 can easily be released from the magnetic coupling with the driving mechanism 16 by forcing up the front end of the cartridge 34 in taking out the cartridge 34, utilizing the principle of the lever, so that the takeout of the cartridge 34 may be facilitated to a high degree. With the mechanism of this invention, further, the front portion of the cartridge 34, along with that of the cartridge receiver 28, may project from the casing 12 to expediate the setting and removal of the cartridge 34. Furthermore, the cartridge 34, which is inserted into the housing 12 through the front thereof, is lowered from the position of such insertion down to the driving mechanism 16 through but a short distance, so that the device need not be very thick, requiring no large space above.

Although these embodiments of this invention have been described herein, the invention is not limited to such embodiment, and various changes and modifications may be effected therein.

For example, the mechanism to guide the cartridge receiver 28 need not always be the second guide means (58, 60, 54, 56), and it may be of any suitable construction provided it enables vertical and longitudinal movements of the cartridge receiver 28. Also, the cam member 78 may be any other suitable member than the one illustrated, so long as it fulfills the same function. Although in the above-mentioned embodiment the cover 62 serves also as a means for drawing and pushing the cartridge receiver 28 out of and into the casing 12, any suitable means for moving the cartridge receiver may be provided separately from the cover.

Furthermore, the mechanism to incline the cartridge receiver 28 in drawing out the cartridge need not be used especially where the magnetic disk 44 need not be released from the coupling with the driving mechanism 16 by inclining the cartridge receiver 28, e.g. if the cartridge is light in weight or if the device is intended to be simple. Such modification may be effected by removing the cam member 78, locking lever 126 and other members related thereto, connecting the rear end of the coupling link 76 directly to the forward end portion of the side wall 32 of the cartridge receiver 28, forming the front and rear guide slots 54 and 56 in the same shape, and removing the perpendicular portion 98 from the front guide slot 54. FIGS. 11 and 12 show a cartridge receiver 28a and front and rear guide slots 54a and 56 obtained as a result of the aforesaid modification.

What we claim is:

1. A cartridge loading mechanism for magnetic disk drive apparatus, comprising:
   a housing with an opening at the front end thereof;
   a driving means disposed in said housing;
   a cartridge receiver means having a base plate to bear a magnetic disk cartridge inserted through said opening and containing a magnetic disk which is adapted to be rotated by said driving means, said cartridge being capable of being slid on said base plate in a longitudinal direction to be located in a given oriented position, said base plate having an opening therein;
   first guide means for guiding the cartridge on said cartridge receiver means, said first guide means including straight guide ridge means formed on said cartridge and straight guide bar means mounted on said cartridge receiver means and extending in said longitudinal direction, said straight guide bar means engaging said guide ridge means while said cartridge is slid and supported on said base plate, so that said cartridge may be properly oriented and located angularly relative to said cartridge receiver means;

means for limiting longitudinal movement of said cartridge relative to said cartridge receiving means to properly locate the cartridge longitudinally relative to said cartridge receiver means;

second guide means for guiding said cartridge receiver means to an operating position where the magnetic disk in said cartridge receiver means is coupled with said driving means when said cartridge receiver means is pushed in backward and longitudinally of said housing after said cartridge is properly oriented and located relative to said cartridge receiver means and for guiding said cartridge receiver means to a non-operating position to allow takeout and setting of the cartridge when said cartridge receiver means means is pulled forward;

shift means for moving said cartridge receiver means forward and backward in the longitudinal direction; and coupling means for coupling said driving means with said magnetic disk, said driving means having a sealing projection protruding from said driving means to surround said coupling means and extend through said base plate opening when said cartridge receiver means is in said operating position to abut against the bottom of said cartridge.

2. A cartridge loading mechanism according to claim 1 further comprising a door means to open and close the opening and coupling links each with one end connected to said door means and with the other end connected to said cartridge receiver means, said cartridge receiver means being moved forward or backward by means of said coupling link when said door means is driven to open or close said opening.

3. A cartridge loading mechanism according to claim 1, wherein said cartridge receiver means has a pair of side walls extending substantially longitudinally at an interval wide enough to receive said cartridge and erected substantially perpendicularly on said base plate, and wherein said second guide means includes a fixed plate mounted substantially horizontally on said driving means, a guide frame having a pair of guiding side walls erected substantially perpendicularly on said fixed plate and extending substantially in parallel with each other on the respective outer sides of the side walls of said cartridge receiver, front and rear guide rollers protruding outward respectively from said pair of side walls to said guiding side walls, and front and rear guide slots defined respectively in said guiding side walls and engaging said front and rear guide rollers respectively.

4. A cartridge loading mechanism according to claim 3, wherein said front and rear guide slots have substantially the same shape, and are each formed of a horizontal portion extending substantially horizontally and a slant portion backwardly sloping down from the rear end of said horizontal portion.

5. A cartridge loading mechanism for magnetic disk drive apparatus, comprising:

a housing with an opening at the front end thereof;

a driving means disposed in said housing;

a cartridge receiver means having a base plate to bear a magnetic disk cartridge inserted through said opening and containing a magnetic disk which is rotated by said driving means, said cartridge receiver means having a pair of sidewalls extending substantially longitudinally at an interval wide enough to receive said cartridge and erected substantially perpendicularly on said base plate, said cartridge being capable of being slid on said base plate to be located in a given oriented position;

first guide means for guiding the cartridge on said cartridge receiver means so that said cartridge may be properly oriented and located relatively to said cartridge receiver;

second guide means guiding said cartridge receiver means to an operating position where the magnetic disk in said cartridge is coupled with said driving means once the cartridge receiver means is pushed in backward, and guiding said cartridge receiver means to a non-operating position to allow takeout and setting of the cartridge once said cartridge receiver means is pulled forward, said second guide means including a fixed plate mounted substantially horizontally on said driving means, a guide frame having a pair of guiding side walls erected substantially perpendicularly on said fixed plate and extending substantially in parallel with each other on the respective outer sides of the side walls of said cartridge receiver means, front and rear guide rollers protruding outwardly respectively from said pair of side walls to said guiding side walls, and front and rear guide slots defined respectively in said guiding side walls and engaging said front and rear guide rollers, respectively, said front guide slots being formed of a horizontal portion extending substantially horizontally and longitudinally, a slant portion backward sloping from the rear end of said horizontal portion, and a perpendicular portion extending substantially perpendicularly from the rear end said slant portions, said rear guide slots being formed of a horizontal portion substantially as long as the horizontal portion of said front guide slot and a slant portion extending along a straight line connecting the rear end of the horizontal portion of said rear guide slot with a position corresponding to the bottom end of the perpendicular portion of said front guide slot; and shift means for moving said cartridge receiver means in the longitudinal direction.

6. A cartridge loading mechanism according to claim 5, wherein said second guide means includes raising mechanisms each interposed between each said shift means and said cartridge receiver means, each said raising mechanism being driven by a forward movement of said shift means when said cartridge receiver means in said operating position is drawn out toward said non-operating position, whereby said front guide roller is forced up to the upper end of said perpendicular portion to release said magnetic disk from the coupling with said driving mechanism.

7. A cartridge loading mechanism according to claim 6, wherein each said raising mechanism includes a cam member pivotally mounted on said cartridge receiver and engaging with an engaging roller on said guide frame when pulled forward by said shift means to rotate, whereby the front end of said cartridge receiver means is forced up, a stopper pin stopping the rotation of said cam member when said cam member is rotated to cause said front guide roller to reach the upper end of the perpendicular portion of said front guide slot, whereby said cartridge receiver means is enabled to be drawn out thereafter, and a locking lever pivotally mounted on said cartridge receiver means and rocking to engage said cam member when said cartridge receiver means is pulled forward, whereby said cam member is prohibited from rotation.

* * * * *